US012060825B1

United States Patent
Shi et al.

(10) Patent No.: US 12,060,825 B1
(45) Date of Patent: Aug. 13, 2024

(54) TWO-STAGE TURBOCHARGING ENERGY-EFFICIENT SELF-ADAPTIVE CONTROL METHOD BASED ON MULTI-POINT INTAKE AND EXHAUST PRESSURE

(71) Applicant: Shanghai Jiao Tong University, Shanghai (CN)

(72) Inventors: Lei Shi, Shanghai (CN); Ling Leng, Shanghai (CN); Junwei Li, Shanghai (CN); Yong Zhang, Shanghai (CN); Kangyao Deng, Shanghai (CN)

(73) Assignee: Shanhai Jiao Tong University, Shanghai (CN)

( * ) Notice: Subject to any disclaimer, the term of this patent is extended or adjusted under 35 U.S.C. 154(b) by 0 days.

(21) Appl. No.: 18/594,654

(22) Filed: Mar. 4, 2024

(30) Foreign Application Priority Data

Mar. 28, 2023 (CN) .......................... 202310309202.3

(51) Int. Cl.
*F02B 37/18* (2006.01)
*F02B 37/00* (2006.01)
(Continued)

(52) U.S. Cl.
CPC .......... *F02B 37/183* (2013.01); *F02B 37/004* (2013.01); *F02B 37/013* (2013.01); *F02D 41/0007* (2013.01)

(58) Field of Classification Search
CPC .... F02B 37/004; F02B 37/007; F02B 37/013; F02B 37/04–11; F02B 37/12;
(Continued)

(56) References Cited

U.S. PATENT DOCUMENTS

| 7,775,043 B2 * | 8/2010 | Funke et al. .......... F02D 41/221 60/602 |
| 10,024,227 B2 * | 7/2018 | Xiao et al. ............. F02B 39/10 60/600 |
| 2015/0068203 A1 * | 3/2015 | Wang et al. ............ F02B 37/13 60/600 |

FOREIGN PATENT DOCUMENTS

| CN | 109854402 A | 6/2019 |
| CN | 110529234 A | 12/2019 |

(Continued)

*Primary Examiner* — Loren C Edwards
(74) *Attorney, Agent, or Firm* — Woodard, Emhardt, Henry, Reeves & Wagner, LLP

(57) ABSTRACT

A two-stage turbocharging energy-efficient self-adaptive control method based on multi-point intake and exhaust pressures in diesel engine turbocharging field, including: determining a target turbocharging pressure for plains upon diesel engine speed and load conditions; adjusting it to obtain optimal target turbocharging pressures for varying altitudes; using these and measured multi-point pressures in intake and exhaust pipelines as inputs, based on an energy utilization analysis model, to determine the two-stage turbocharging energy utilization efficiency suitable for different altitude environmental conditions; according to the optimal overall efficiency principle of the two-stage turbocharging system at variable altitudes, calculating opening degrees of the bypass valves that meets the target total pressure ratio by a valve control unit. Reasonable distribution of exhaust energy between the two-stage turbochargers is achieved. The invention can achieve an efficient utilization of exhaust energy, and self-adaptive control of a variable-altitude two-stage turbocharging system.

3 Claims, 3 Drawing Sheets

(51) Int. Cl.
*F02B 37/013* (2006.01)
*F02D 41/00* (2006.01)

(58) Field of Classification Search
CPC ........ F02B 37/18; F02B 37/183; Y02T 10/12; F02D 41/0007
See application file for complete search history.

(56) References Cited

FOREIGN PATENT DOCUMENTS

| | | | |
|---|---|---|---|
| CN | 111075578 | A | 4/2020 |
| CN | 113738518 | A | 12/2021 |
| CN | 113738519 | A | 12/2021 |
| CN | 114060143 | A | 2/2022 |

\* cited by examiner

TWO-STAGE TURBOCHARGING ENERGY-EFFICIENT SELF-ADAPTIVE CONTROL METHOD BASED ON MULTI-POINT INTAKE AND EXHAUST PRESSURE

FIELD OF THE DISCLOSURE

The present invention relates to an energy-efficient self-adaptive control method in the technical field of diesel engine turbocharging, particularly a two-stage turbocharging energy-efficient self-adaptive control method based on multi-point intake and exhaust pressures that can adaptively control the opening degrees of two-stage turbocharging bypass valves.

BACKGROUND

The world's plateaus are mainly located in Eurasia, North/South America, and Australia, and together with the surrounding basin areas, they account for about 45% of the total land area. China has a vast territory and complex and interchanging terrain. The plateau areas 1000 m or more above sea level account for 58% of the country's total area, and the plateau areas 3000 m or more above sea level account for about 26%.

For a turbocharged diesel engine, its overall performance can only be achieved when the turbine power capacity of the turbocharging system can meet the power consumption requirements of the compressors. The balancing relationship between the turbine power and the compressor power demand will change following the changes in the diesel engine speed, torque, and intake/exhaust environmental conditions. When the diesel engine operates at varying altitudes, the ranges of the changing intake pressure and temperature are large. Diesel engines are prone to problems such as insufficient combustion, reduced output power, and increased fuel consumption.

Adjustable two-stage turbocharging technology can meet the air intake needs under different operating conditions at different altitudes. However, the different pressure ratio distribution of high- and low-pressure stage turbochargers seriously affects the utilization of exhaust energy. If the two-stage turbocharging energy is unbalanced, it results in a reduction in efficiency and can easily lead to insufficient turbocharging. To improve its adaptability to changing altitudes, to reasonably distribute and utilize the exhaust energy between the two-stage turbochargers, according to the principle of optimal overall efficiency of the two-stage turbocharging system with changing altitudes, it is of great significance to establish an energy-efficient self-adaptive variable altitude control method which takes into account both the turbocharging pressure recovery and the adjustable two-stage turbocharging system's total efficiency, based on multi-point pressures of the intake and exhaust systems. However, there are no relevant patents in the prior arts.

SUMMARY OF THE INVENTION

In view of the shortcomings of the prior arts, the present invention proposes a two-stage turbocharging energy-efficient self-adaptive control method based on multi-point intake and exhaust pressures, which can determine the optimal turbocharging pressure according to changes in altitude and engine operating conditions. The multi-point pressures of the intake/exhaust systems are used to establish a two-stage turbocharging energy utilization efficiency analysis model. The exhaust energy flowing through the two-stage turbines is controlled through the high- and low-pressure stage turbine bypass valves to achieve that the turbocharging system works in the high-efficiency zone within the full operating range of the engine under various altitude conditions, and to achieve a reasonable distribution of exhaust energy, and to achieve efficient self-adaptive control of a variable-altitude two-stage turbocharging system based on turbocharging pressure recovery.

The present invention is realized through the following technical solutions. The present invention comprises the following steps: step one, for an adjustable two-stage turbocharging system, determining a target turbocharging pressure for a plain terrain based on rotation speed and load conditions of a diesel engine, and correcting the target turbocharging pressure according to altitudes to obtain optimal target turbocharging pressures at varying altitudes; step two, using the optimal target turbocharging pressures at varying altitudes and measured multi-point pressures in intake and exhaust pipelines of the two-stage turbocharging system as input variables, to calculate energy utilization efficiencies suitable for environmental conditions at different altitudes based on an energy utilization efficiency analysis model of the two-stage turbocharging system; and step three, based on a principle of optimal overall efficiency of the two-stage turbocharging system, calculating opening degrees of high- and low-pressure stage bypass valves in real time that meet a target total pressure ratio, and self-adaptively controlling the opening degrees of the bypass valves to enable reasonable distribution of exhaust energy between two turbochargers; wherein the calculation is carried out by a valve control unit.

Preferably, inn step one, the optimal target turbocharging pressures for variable altitudes are obtained by, first determining the target turbocharging pressure for a plain terrain by the rotation speed and load conditions, and then correcting the target turbocharging pressure according to the altitudes, wherein for every 100 m of elevation relative to 0 m, the target turbocharging pressure is corrected by +(0.0012-0.0018) bar, to obtain the optimal target turbocharging pressures, wherein the optimal turbocharging pressure is numerically equivalent to a high-pressure stage turbine outlet pressure.

More preferably, in step two, a calculation formula of the energy utilization efficiency analysis model of the two-stage turbocharging system for variable altitudes is:

$$\eta_{TS} = \eta_{TS1} \cdot \eta_{TS2} \cdot \eta_m$$

wherein, $\eta_{TS1}$ is a mechanical efficiency of a high-pressure stage turbocharger, $\eta_{TS2}$ is an efficiency of a low-pressure stage turbocharger, and $\eta_m$ is a mechanical efficiency of the turbochargers;

wherein, the efficiency of the high-pressure stage turbocharger $\eta_{TS1}$ and the efficiency of the low-pressure stage turbocharger $\eta_{TS2}$ are calculated by:

$$\eta_{TS} = \alpha \cdot \beta \cdot \frac{T_{si}^*}{T_{Ci}^*} \cdot \frac{\left[\left(\frac{p_{IM,eq}^*}{p_{Si,eq}^*}\right)^{\frac{\kappa_A-1}{\kappa_A}} - 1\right]}{\left[1 - \left(\frac{p_{EM,eq}^*}{p_{So,eq}^*}\right)^{\frac{1-\kappa_G}{\kappa_G}}\right]} \cdot \frac{\left[1 - \left(\frac{p_{Ti,eq}^*}{p_{To,eq}^*}\right)^{\frac{1-\kappa_G}{\kappa_G}}\right]}{\left[\left(\frac{p_{Co,eq}^*}{p_{Ci,eq}^*}\right)^{\frac{\kappa_A-1}{\kappa_A}} - 1\right]};$$

wherein, $\eta_{TS}$ is the efficiency of the turbochargers; $K_A$ and $K_G$ are coefficients related to a state of gas, whereby for a four-stroke diesel engine, $K_A \approx 1.399$ and $K_G \approx 1.343$;

and $p^*_{IM,eq}$ is an intake manifold pressure in Pa, $p^*_{Si,eq}$ is a system boundary air pressure in Pa; $p^*_{Co,eq}$ is a compressor outlet pressure in Pa, $p^*_{Ci,eq}$ is a compressor inlet pressure in Pa, $p^*_{Ti,eq}$ is a turbine inlet pressure in Pa, $p^*_{To,eq}$ is a turbine outlet pressure in Pa, $p^*_{EM,eq}$ is an exhaust manifold pressure in Pa, $p^*_{So,eq}$ is a system boundary pressure in Pa, $T^*_{si}$ is a system boundary air temperature in K, $T^*_{Ci}$ is a compressor inlet temperature in K, α is an intake air temperature correction coefficient at different altitudes, β is a bypass flow ratio of the bypass valves.

More preferably, the bypass flow ratio of the bypass valves is a ratio of between an exhaust gas flow of the bypass valve and an entire exhaust gas flow of a high-pressure stage turbine, with a calculation formula:

$$\beta = \frac{m_V}{m_V + m_T} = \frac{\varphi_v - A_V}{\varphi_v A_V + A_T};$$

wherein, $m_V$ and $m_T$ are the exhaust gas flow of the bypass valve and the turbine respectively in kg/s, $A_V$ is an equivalent flow area of the bypass valve in m², $\varphi_v$ is a flow coefficient of the bypass valve, and $A_T$ is an equivalent flow area of a turbine in m².

More preferably, the exhaust gas flow of the turbine $m_T$ and the exhaust gas flow of the bypass valve $m_V$ are calculated by:

$$m_T = c_d A_T \frac{p_{dt}}{\sqrt{RT_{ut}}} \prod_t \psi_t\left(\prod_t\right),$$

$$m_V = c_d A_V \frac{p_{dv}}{\sqrt{RT_{uV}}} \prod_V \psi_V\left(\prod_V\right);$$

wherein, $C_d$ is a flow coefficient, $P_{di}$ is a pressure downstream of the turbine in Pa, $T_{ut}$ is a temperature upstream of the turbine in K; $P_{dv}$ is a pressure downstream of the bypass valve in Pa, $T_{uV}$ is a temperature upstream of the bypass valve in K, $\psi_t(\Pi_t)$ and $\psi_V(\Pi_V)$ are flow functions of the turbine and the bypass valve respectively; wherein the flow functions are calculated by:

$$\psi_t\left(\prod_T\right) = \prod_t^{\frac{\kappa_G-2}{2\kappa_G}} \sqrt{\frac{2\kappa_G}{\kappa_G-1} \cdot f_{lim}\left(1 - \prod_t^{\frac{-\kappa_G+1}{\kappa_G}}\right)},$$

$$\psi_V\left(\prod_V\right) = \prod_v^{\frac{-1}{\kappa_G}} \sqrt{\frac{2\kappa_G}{\kappa_G-1} \cdot f_{lim}\left(1 - \prod_V^{\frac{-\kappa_G+1}{\kappa_G}}\right)},$$

$$f_{lim}(x) = \frac{1}{2}\sqrt{x^2 + \varepsilon} + \frac{1}{2}x;$$

wherein, $K_G$ is a coefficient related to a stage of gas, whereby for a four-stroke diesel engine, $K_G \approx 1.343$; and ε is a positive value and is close to 0, $\Pi_t$ and $\Pi_V$ are pressure ratios of the turbine and the bypass valve respectively, which are defined by inlet and outlet states, and are calculated by:

$$\prod_t = \frac{p_{ut}}{p_{dt}},$$

$$\prod_V = \frac{p_{uv}}{p_{dv}};$$

wherein, $p_{uv}$ is a pressure upstream of the bypass valve in Pa, $p_{dv}$ is a pressure downstream of the bypass valve in Pa, $P_{ut}$ is a pressure upstream of the turbine in Pa; $p_{dt}$ is a pressure downstream of the turbine in Pa.

Compared with the existing technologies, the present invention has the following beneficial effects. According to the overall efficiency optimization principle of the variable-altitude two-stage turbocharging system, the valve control unit can calculate in real time the opening degrees of the high- and low-pressure stage turbine bypass valves to meet the target total pressure ratio. The exhaust energy is reasonably distributed and utilized between the two-stage turbochargers to achieve energy balance adjustment and to establish an energy-efficient self-adaptive variable altitude control method which considers both the turbocharging pressure recovery and the adjustable two-stage turbocharging system's total efficiency. Reasonable distribution of exhaust energy and efficient self-adaptive control of two-stage turbocharging at variable altitudes are achieved.

EXPLANATION OF REFERENCE NUMBERS

1. Diesel engine, 2. High-pressure stage intercooler, 3. High-pressure stage compressor, 4. Low-pressure stage intercooler, 5. Low-pressure stage turbine, 6. High-pressure stage turbine, 7. High-pressure stage turbine bypass valve, 8. Low-pressure stage turbine bypass valve, 9. Valve control unit, 10. Electronic control unit, 11. Pressure and temperature sensor downstream of high-pressure stage intercooler, 12. Pressure and temperature sensor upstream of high-pressure stage intercooler, 13. Pressure and temperature sensor downstream of low-pressure stage intercooler, 14. Pressure and temperature sensor upstream of low-pressure stage intercooler, 15. Intake pressure and temperature sensor, 16. Low-pressure stage turbocharger speed sensor, 17. Pressure and temperature sensor downstream of turbines, 18. Pressure and temperature sensor between turbines, 19. Pressure and temperature sensor upstream of turbines, 20. High pressure stage turbocharger speed sensor, 21. Low pressure stage compressor, 22. Diesel engine intake pipeline, 23. Diesel engine exhaust pipeline road.

DESCRIPTION OF THE ILLUSTRATED EMBODIMENTS

The embodiments of the present invention will be described in detail below with reference to the accompanying drawings. These embodiments are based on the technical solution of the present invention and provides detailed implementation modes and specific operating processes.

However, the protection scope of the present invention is not limited to the following embodiments.

Embodiments

Figure 1:
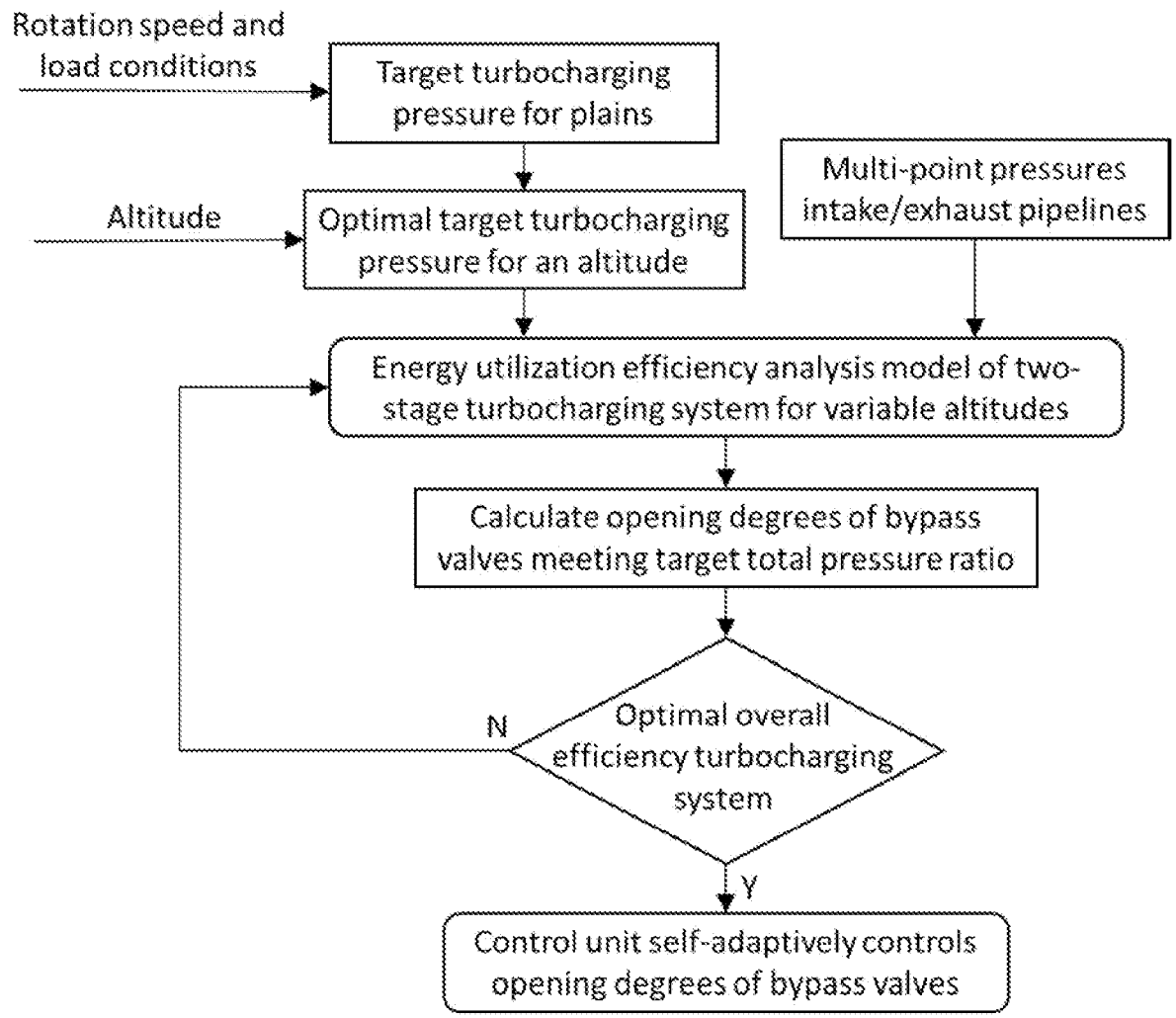
FIG. 1 is a flow chart of the method of the present invention.
Figure 2:
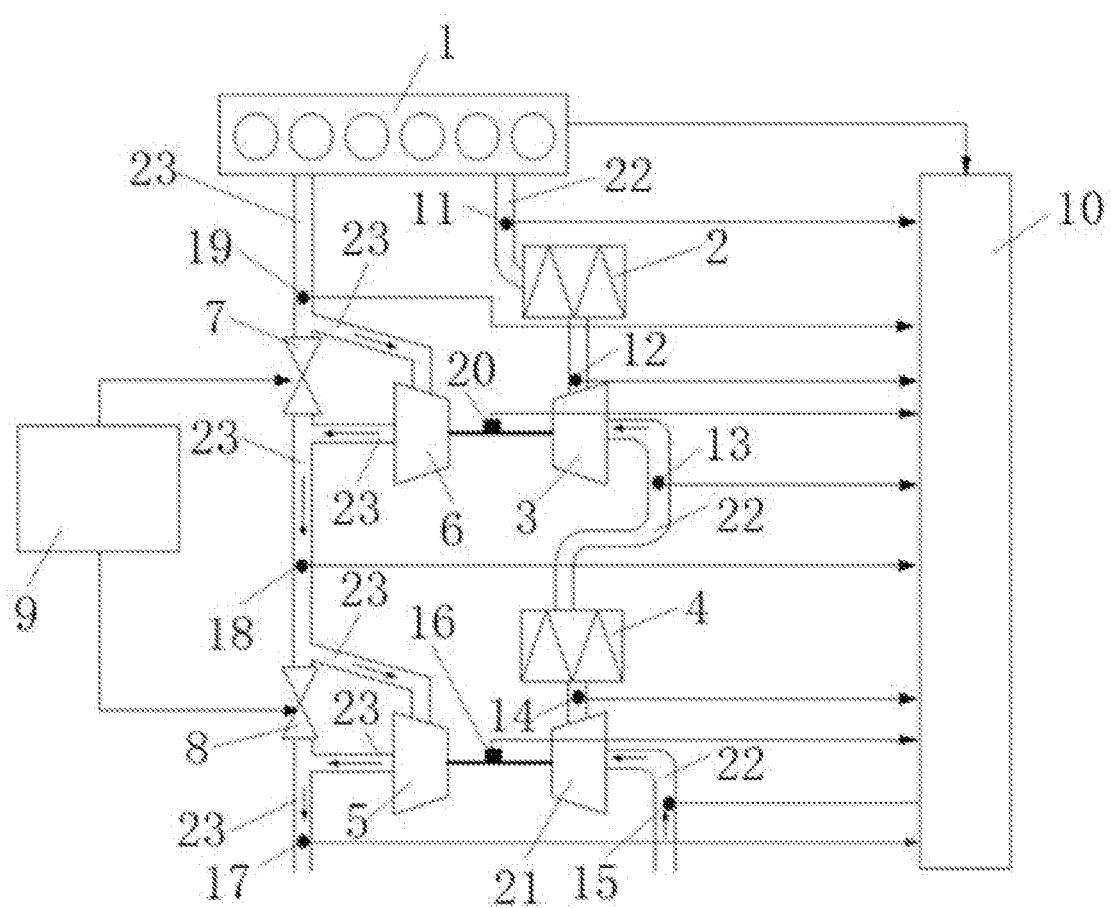
FIG. 2 is a schematic structural diagram of an adjustable two-stage turbocharging system in an embodiment of the present invention.

The flow chart of an embodiment of the present invention is shown in FIG. 1, and the structural diagram of an embodiment of the present invention is shown in FIG. 2.

As shown in FIG. 2, the embodiment of the present invention includes a diesel engine 1, a high-pressure stage intercooler 2, a high-pressure stage compressor 3, a low-pressure stage intercooler 4, a low-pressure stage turbine 5, a high-pressure stage turbine 6, and a high-pressure stage turbine bypass valve 7, a low-pressure stage turbine bypass valve 8, a valve control unit 9, an electronic control unit 10, a pressure and temperature sensor downstream of high-pressure stage intercooler 11, a pressure and temperature sensor upstream of high-pressure stage intercooler 12, a pressure and temperature sensor downstream of low-pressure stage intercooler 13, a pressure and temperature sensor upstream of low-pressure stage intercooler 14, an intake pressure and temperature sensor 15, a low-pressure stage turbocharger speed sensor 16, a pressure and temperature sensor downstream of turbines 17, a pressure and temperature sensor between turbines 18, a pressure and temperature sensor upstream of turbines 19, a high-pressure stage turbocharger speed sensor 20, a low-pressure stage compressor 21, a diesel engine intake pipeline 22, a diesel engine exhaust pipeline 23.

The outlet of the diesel engine air intake pipeline 22 is connected to the inlet of the diesel engine 1. The inlet of the diesel engine exhaust pipeline 23 is connected to the exhaust of the diesel engine 1. Along the direction of the intake air flow, the low-pressure stage compressor 21, the low-pressure stage intercooler 4, the high-pressure stage compressor 3, and the high-pressure stage intercooler 2 are connected in series by the diesel engine intake pipeline 22. Along the direction of the exhaust flow, the high-pressure stage turbine 6 and the low-pressure stage turbine 5 are connected in series by the diesel engine exhaust pipeline 23. The low-pressure stage compressor 21 and the low-pressure stage turbine 5 are coaxially connected. The high-pressure stage compressor 3 and the high-pressure stage turbine 6 are coaxially connected. The inlet and outlet of the high-pressure stage turbine bypass valve 7 are respectively connected to the diesel exhaust pipelines 23 at places upstream of and downstream of the high-pressure stage turbine 6. The inlet and outlet of the low-pressure stage turbine bypass valve 8 are respectively connected to the diesel engine exhaust pipelines 23 at places upstream of and downstream of the low-pressure stage turbine 5. The high-pressure stage turbine bypass valve 7 and the low-pressure stage turbine bypass valve 8 are connected to the valve control unit 9 through wiring harnesses.

The pressure and temperature sensor 11 downstream of the high-pressure stage intercooler is arranged on the diesel engine intake pipeline 22 downstream of the high-pressure stage intercooler 2, and the pressure and temperature sensor 12 upstream of the high-pressure stage intercooler is arranged between the high-pressure stage intercooler 2 and the high-pressure stage compressor 3. The pressure and temperature sensor 13 downstream of the low-pressure stage intercooler is arranged on the diesel engine intake pipeline 22 between the high-pressure stage compressor 3 and the low-pressure stage intercooler 4. The pressure and temperature sensor 14 upstream of the low-pressure stage intercooler is arranged on the diesel engine intake pipeline 22 between the low-pressure stage intercooler 4 and the low-pressure stage compressor 21, and the intake pressure and temperature sensor 15 is arranged on the diesel engine intake pipeline 22 upstream of the low-pressure stage compressor 21.

The pressure and temperature sensor 17 downstream of low-pressure stage turbine is arranged on the diesel engine exhaust pipeline 23 downstream of the low-pressure stage turbine 5, and the pressure and temperature sensor 18 between turbines is arranged on the diesel engine exhaust pipeline 23 between the low-pressure stage turbine 5 and the high-pressure stage turbine 6. The pressure and temperature sensor 19 upstream of turbines is arranged on the diesel engine exhaust pipeline 23 upstream of the high-pressure stage turbine 6.

The low-pressure stage turbocharger speed sensor 16 is arranged on the connecting shaft between the low-pressure stage compressor 21 and the low-pressure stage turbine 5. The high-pressure stage turbocharger speed sensor 20 is arranged on the connecting shaft between the high-pressure stage compressor 3 and the high-pressure stage turbine 6. The pressure and temperature sensor 11 downstream of high-pressure stage intercooler, the pressure and temperature sensor 12 upstream of high-pressure stage intercooler, the pressure and temperature sensor 13 downstream of low-pressure stage intercooler, the pressure and temperature sensor 14 upstream of low-pressure stage intercooler, the intake pressure and temperature sensor 15, the low-pressure stage turbocharger speed sensor 16, the pressure and temperature sensor 17 downstream of turbines, the pressure and temperature sensor 18 between turbines, the pressure and temperature sensor 19 upstream of the turbines, and the high-pressure stage turbocharger speed sensor 20 are all connected to the electronic control unit 10 through wiring harnesses.

The implementation process of the present embodiment is as follows.

First, a target turbocharging pressure for a plain terrain is determined according to the corresponding rotation speed and load conditions, and the target turbocharging pressure is corrected according to the altitude. For every 100 meters of elevation relative to 0 m, the target turbocharging pressure is changed by +(0.0012-0.0018) bar, thus obtaining an optimal target turbocharging pressure for varying altitudes, which is numerically equal to the high-pressure stage turbine outlet pressure. The environmental pressure and the pressure of the intake and exhaust systems are directly measured by sensors, and then the target pressure ratio of the two-stage turbocharging system is obtained.

Then, the energy utilization efficiency of the two-stage turbocharging system suitable for different altitude environmental conditions is calculated. The two-stage turbocharging energy utilization efficiency analysis model is:

$$\eta_{TS} = \alpha \cdot \beta \cdot \frac{T_{si}^*}{T_{Ci}^*} \cdot \frac{\left[\left(\frac{p_{IM,eq}^*}{p_{Si,eq}^*}\right)^{\frac{\kappa_A-1}{\kappa_A}} - 1\right]}{\left[1 - \left(\frac{p_{EM,eq}^*}{p_{So,eq}^*}\right)^{\frac{1-\kappa_G}{\kappa_G}}\right]} \cdot \frac{\left[1 - \left(\frac{p_{Ti,eq}^*}{p_{To,eq}^*}\right)^{\frac{1-\kappa_G}{\kappa_G}}\right]}{\left[\left(\frac{p_{Co,eq}^*}{p_{Ci,eq}^*}\right)^{\frac{\kappa_A-1}{\kappa_A}} - 1\right]}.$$

wherein, $n_{TS}$ is the turbocharger efficiency; $K_A$ and $K_G$ are coefficients related to the state of the air. For example, for a four-stroke diesel engine, $K_A \approx 1.399$ and $K_G \approx 1.343$. And $p^*_{IM,eq}$ is the intake manifold pressure in Pa; $p^*_{Si,eq}$ is the system boundary air pressure in Pa; $p^*_{Co,eq}$ is the compressor outlet pressure in Pa; $p^*_{Ci,eq}$ is the compressor inlet pressure in Pa; $p^*_{Ti,eq}$ is the turbine inlet pressure in Pa; $p^*_{To,eq}$ is the turbine outlet pressure in Pa; $p^*_{EM,eq}$ is the exhaust manifold pressure in Pa; $p^*_{So,eq}$ is the system boundary pressure in Pa; $T^*_{si}$ is the system boundary air temperature in K; $T^*_{Ci}$ is the compressor inlet temperature in K; α is the intake air temperature correction coefficient at different altitudes; β is the bypass flow ratio of the turbine bypass valves, the value of which is the ratio between the exhaust gas flow of the turbine bypass valves and the exhaust gas flow of the entire high-pressure stage turbine:

$$\beta = \frac{m_V}{m_V + m_T} = \frac{\varphi_v - A_V}{\varphi_v A_V + A_T}.$$

Figure 3:
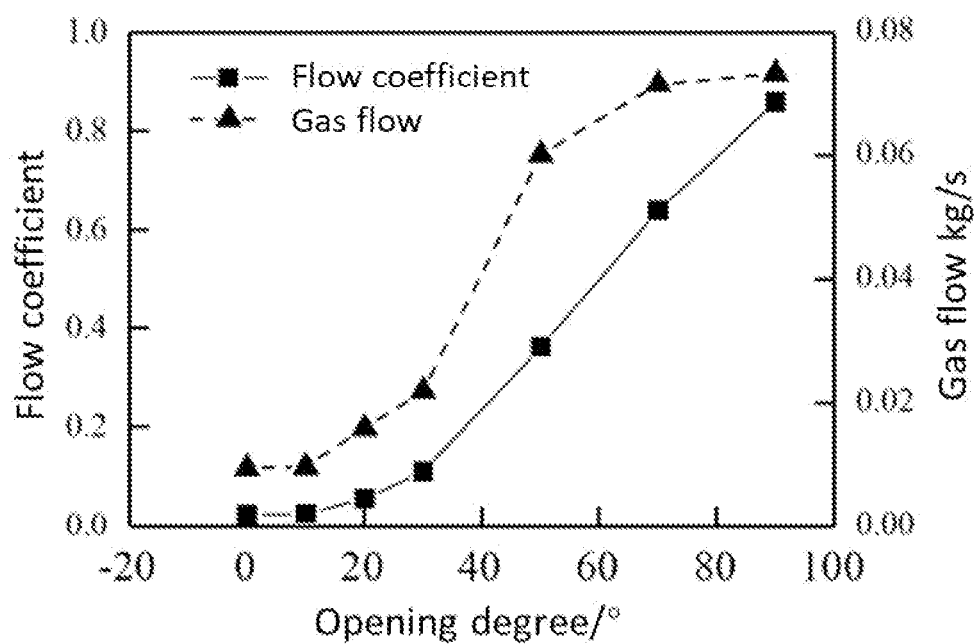
FIG. 3 is a diagram showing the change in flow coefficient of the turbine bypass valves upon opening degrees in an embodiment of the present invention.

Wherein, $m_V$ and $m_T$ are the exhaust gas flowing through the turbine bypass valve and the turbine respectively in kg/s; $A_V$ is the equivalent flow area of the turbine bypass valve in $m^2$; $\varphi_v$ is the flow coefficient of the bypass valve, and $A_T$ is the equivalent flow area of the turbine, in $m^2$. The flow coefficient of the turbine bypass valve at 1500 r/min and 50% load at plain environmental conditions is shown in FIG. 3. According to the valve flow characteristics, when the valve opening degree changes in the range of 0° to 30°, the changing rate of the flow coefficient is small; and, when the valve opening degree changes in the range of 30° to 90°, the flow coefficient changing rate is larger. Therefore, when the valve opening degree is small, a larger valve opening degree change is required to achieve optimal overall efficiency of the variable altitude two-stage turbocharging system.

And wherein, the calculation formulas of the exhaust gas flowing through the turbine and turbine bypass valve are:

$$m_T = c_d A_T \frac{p_{dt}}{\sqrt{RT_{ut}}} \prod_t \psi_t\left(\prod_t\right),$$

$$m_V = c_d A_V \frac{p_{dv}}{\sqrt{RT_{uV}}} \prod_V \psi_V\left(\prod_V\right);$$

wherein $c_d$ is the flow coefficient, $p_{dt}$ is the pressure downstream of the turbine in Pa; $T_{ut}$ is the temperature upstream of the turbine in K; $p_{dv}$ is the pressure downstream of the valve in Pa; $T_{uV}$ is the temperature upstream of the valve in K; $\psi_t(\Pi_t)$ and $\psi_V(\Pi_V)$ are flow functions of the turbine and the turbine bypass valve respectively. The corresponding calculation formulas are:

$$\psi_t\left(\prod_T\right) = \prod_t^{\frac{\kappa_G - 2}{2\kappa_G}} \sqrt{\frac{2\kappa_G}{\kappa_G - 1} \cdot f_{lim}\left(1 - \prod_t^{\frac{-\kappa_G + 1}{\kappa_G}}\right)},$$

$$\psi_V\left(\prod_V\right) = \prod_V^{\frac{-1}{\kappa_G}} \sqrt{\frac{2\kappa_G}{\kappa_G - 1} \cdot f_{lim}\left(1 - \prod_V^{\frac{-\kappa_G + 1}{\kappa_G}}\right)},$$

$$f_{lim}(x) = \frac{1}{2}\sqrt{x^2 + \varepsilon} + \frac{1}{2}x;$$

wherein ε is a positive value and is close to 0, $\Pi_t$ and $\Pi_V$ are the pressure ratios of the turbine and the valve respectively, which are defined by the inlet and outlet states.

The calculation formulas are:

$$\prod_t = \frac{p_{ut}}{p_{dt}},$$

$$\prod_V = \frac{p_{uv}}{p_{dv}};$$

wherein, $p_{uv}$ is the pressure upstream of the valve in Pa; $p_{dv}$ is the pressure downstream of the valve in Pa; $p_{ut}$ is the pressure upstream of the turbine in Pa; $p_{di}$ is the pressure downstream of the turbine in Pa.

Hereby, the efficiency of the high-pressure stage turbocharger $\eta_{TS1}$ and the efficiency of the low-pressure stage turbocharger $\eta_{TS2}$ are calculated respectively. The formula for the overall energy utilization efficiency of the adjustable two-stage turbocharging system is:

$$\eta_{TS}' = \eta_{TS1} \cdot \eta_{TS2} \cdot \eta_m$$

wherein, $\eta_m$ is the mechanical efficiency of the turbocharger.

Finally, according to the principle of optimal overall efficiency of the variable-altitude two-stage turbocharging system, based on multi-point pressures of the intake and exhaust systems, the valve control unit calculates in real time the opening degrees of the high- and low-pressure stage turbine bypass valves that meet the target total pressure ratio. The exhaust energy is reasonably allocated and utilized between the two-stage turbochargers to achieve energy balance adjustment, and to establish a variable-altitude energy-efficient self-adaptive method that takes into account both turbocharging pressure recovery and overall efficiency of the adjustable two-stage turbocharging system, and to achieve reasonable distribution and efficient self-adaptive control of exhaust energy in the two-stage turbocharging system.

In the present invention, the diesel engine is equipped with speed and throttle position sensors, and multi-point temperature and pressure measurements of the intake and exhaust systems are performed, including measurements of the intake air pressure/temperature, the upstream/downstream pressure of the low-pressure stage intercooling, the upstream/downstream pressure of the high-pressure stage intercooling, and pressures upstream of/between/downstream of the turbines. The pressure sensors deploy high-frequency dynamic pressure transmitters with high inherent frequency, short rise time, wide response frequency band, and can measure real-time changes in pressure. The measurement signals of the sensors are sent to the electronic control unit 10 in real time for signal processing. Based on the rotation speed, torque and intake air pressure and temperature, the target turbocharging pressure that meets the intake demand under variable altitude conditions is determined, and then based on the two-stage turbocharging energy utilization efficiency analysis model, the opening degrees of the high- and low-pressure stage bypass valves are calculated corresponding to the highest efficiency of the turbocharging system, and the opening degree control signals of the bypass valves are sent to the valve control unit. The valve control unit outputs the control signals to the high- and low-pressure stage turbine bypass valves, and carry out feedback control according to the actual turbocharging pressure.

The above embodiments are only illustrative of the design principles and uses of the present invention, and are not intended to limit the present invention. Anyone familiar with this area of technology can modify or change the above embodiments without departing from the spirit and scope of the invention. Therefore, all equivalent modifications or changes made by those with ordinary knowledge in the technical field without departing from the spirit and techni-

The invention claimed is:

1. A two-stage turbocharging energy-efficient self-adaptive control method based on multi-point intake and exhaust pressures, characterized by comprising:

step one: for an adjustable two-stage turbocharging system, determining a target turbocharging pressure for a plain terrain based on rotation speed and load conditions of a diesel engine, and correcting the target turbocharging pressure according to altitudes to obtain optimal target turbocharging pressures at varying altitudes;

step two: using the optimal target turbocharging pressures at varying altitudes and measured multi-point pressures in intake and exhaust pipelines of the two-stage turbocharging system as input variables, to calculate energy utilization efficiencies suitable for environmental conditions at different altitudes based on an energy utilization efficiency analysis model of the two-stage turbocharging system;

step three: based on a principle of optimal overall efficiency of the two-stage turbocharging system, calculating opening degrees of high- and low-pressure stage bypass valves in real time that meet a target total pressure ratio, and self-adaptively controlling the opening degrees of the bypass valves to enable distribution of exhaust energy between two turbochargers; wherein the calculation of the opening degrees of the bypass valves is carried out by a valve control unit;

in step two, a calculation formula of the energy utilization efficiency analysis model of the two-stage turbocharging system is:

$$\eta'_{TS} = \eta_{TS1} \cdot \eta_{TS2} \cdot \eta_m,$$

wherein, $\eta_{TS1}$ is a mechanical efficiency of a high-pressure stage turbocharger, $\eta_{TS2}$ is an efficiency of a low-pressure stage turbocharger, and $\eta_m$ is a mechanical efficiency of the turbochargers;

wherein, the efficiency of the high-pressure stage turbocharger $\eta_{TS1}$ and the efficiency of the low-pressure stage turbocharger $\eta_{TS2}$ are calculated by:

$$\eta_{TS} = \alpha \cdot \beta \cdot \frac{T^*_{si}}{T^*_{Ci}} \cdot \frac{\left[\left(\frac{p^*_{IM,eq}}{p^*_{Si,eq}}\right)^{\frac{K_A-1}{K_A}} - 1\right]}{\left[1 - \left(\frac{p^*_{EM,eq}}{p^*_{So,eq}}\right)^{\frac{1-K_G}{K_G}}\right]} \cdot \frac{\left[1 - \left(\frac{p^*_{Ti,eq}}{p^*_{To,eq}}\right)^{\frac{1-K_G}{K_G}}\right]}{\left[\left(\frac{p^*_{Co,eq}}{p^*_{Ci,eq}}\right)^{\frac{K_A-1}{K_A}} - 1\right]};$$

wherein, $\eta_{TS}$ is the efficiency of the turbochargers; $K_A$ and $K_G$ are coefficients related to a state of gas, whereby for a four-stroke diesel engine, $K_A \approx 1.399$ and $K_G \approx 1.343$; and $p^*_{IM,eq}$ is an intake manifold pressure in Pa, $p^*_{Si,eq}$ is a system boundary air pressure in Pa; $p^*_{Co,eq}$ is a compressor outlet pressure in Pa, $p^*_{Ci,eq}$ is a compressor inlet pressure in Pa, $p^*_{Ti,eq}$ is a turbine inlet pressure in Pa, $p^*_{To,eq}$ is a turbine outlet pressure in Pa, $p^*_{EM,eq}$ is an exhaust manifold pressure in Pa, $p^*_{So,eq}$ is a system boundary pressure in Pa, $T^*_{si}$ is a system boundary air temperature in K, $T^*_{Ci}$ is a compressor inlet temperature in K, $\alpha$ is an intake air temperature correction coefficient at different altitudes, $\beta$ is a bypass flow ratio of the bypass valves;

the bypass flow ratio of the bypass valves is a ratio of between an exhaust gas flow of a bypass valve of the bypass valves and an entire exhaust gas flow of a high-pressure stage turbine, with a calculation formula:

$$\beta = \frac{m_V}{m_V + m_T} = \frac{\phi_V A_V}{\phi_V A_V + A_T},$$

wherein, $m_V$ and $m_T$ are the exhaust gas flow of the respective bypass valve and the turbine respectively in kg/s, $A_V$ is an equivalent flow area of the respective bypass valve in m², $\varphi_V$ is a flow coefficient of the respective bypass valve, and $A_T$ is an equivalent flow area of a turbine in m².

2. The two-stage turbocharging energy-efficient self-adaptive control method based on multi-point intake and exhaust pressures according to claim 1, characterized in that, in step one, the optimal target turbocharging pressures at varying altitudes are obtained by, first determining the target turbocharging pressure for the plain terrain by the rotation speed and the load conditions, and then correcting the target turbocharging pressure according to the altitudes, wherein for every 100m of elevation relative to 0m, the target turbocharging pressure is corrected by +(0.0012-0.0018) bar, to obtain the optimal target turbocharging pressures, wherein the optimal turbocharging pressure is numerically equivalent to a high-pressure stage turbine outlet pressure.

3. The two-stage turbocharging energy-efficient self-adaptive control method based on multi-point intake and exhaust pressures according to claim 1, characterized in that, the exhaust gas flow of the turbine $m_T$ and the exhaust gas flow of the respective bypass valve $m_V$ are calculated by:

$$m_T = c_d A_T \frac{p_{dt}}{\sqrt{RT_{ut}}} \prod_t \psi_t\left(\prod_t\right),$$

$$m_V = c_d A_v \frac{p_{dv}}{\sqrt{RT_{uV}}} \prod_V \psi_V\left(\prod_V\right);$$

wherein $C_d$ is a flow coefficient, $p_{dt}$ is a pressure downstream of the turbine in Pa, $T_{ut}$ is a temperature upstream of the turbine in K; $p_{dv}$ is a pressure downstream of the respective bypass valve in Pa, $T_{uV}$ is a temperature upstream of the respective bypass valve in K, $\psi_t (\Pi_t)$ and $\psi_V (\Pi_V)$ are flow functions of the turbine and the respective bypass valve respectively; wherein the flow functions are calculated by:

$$\psi_t\left(\prod_t\right) = \prod_t^{\frac{K_G-2}{2K_G}} \sqrt{\frac{2K_G}{K_G-1} \cdot f_{lim}\left(1 - \prod_t^{\frac{K_G+1}{K_G}}\right)},$$

$$\psi_V\left(\prod_V\right) = \prod_V^{\frac{-1}{K_G}} \sqrt{\frac{2K_G}{K_G-1} \cdot f_{lim}\left(1 - \prod_V^{\frac{-K_G+1}{K_G}}\right)},$$

$$f_{lim}(x) = \frac{1}{2}\sqrt{x^2 + \varepsilon} + \frac{1}{2}x;$$

wherein, $\varepsilon$ is a positive value and is close to 0, $\Pi_t$ and $\Pi_V$ are pressure ratios of the turbine and the respective bypass valve respectively, which are defined by inlet and outlet states, and are calculated by:

$$\prod{}_t = \frac{p_{ut}}{p_{dt}},$$

$$\prod{}_V = \frac{p_{uv}}{p_{dv}};$$

wherein, $p_{uv}$ is a pressure upstream of the respective bypass valve in Pa, $p_{dv}$ is the pressure downstream of the respective bypass valve in Pa, $p_{ut}$ is a pressure upstream of the turbine in Pa; $p_{dt}$ is the pressure downstream of the turbine in Pa.

\* \* \* \* \*